US008554626B2

(12) United States Patent
Pulijala et al.

(10) Patent No.: US 8,554,626 B2
(45) Date of Patent: Oct. 8, 2013

(54) MOBILE ADVERTISEMENT AND MARKETING INTEGRATION WITH BUSINESS PROCESS AND WORKFLOW SYSTEMS

(75) Inventors: Amitha Pulijala, Milpitas, CA (US);
Terje Strand, San Francisco, CA (US);
Sharath Rajasekar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 12/945,755

(22) Filed: Nov. 12, 2010

(65) Prior Publication Data

US 2011/0112905 A1 May 12, 2011

Related U.S. Application Data

(60) Provisional application No. 61/260,798, filed on Nov. 12, 2009.

(51) Int. Cl.
*G06Q 30/00* (2012.01)

(52) U.S. Cl.
USPC .................. 705/14.64; 705/14.69; 705/14.71; 705/14.72

(58) Field of Classification Search
USPC ....................... 705/14.71, 14.72, 14.64, 14.69
See application file for complete search history.

(56) References Cited

U.S. PATENT DOCUMENTS

| 7,865,394 | B1 | 1/2011 | Calloway et al. | |
|---|---|---|---|---|
| 7,886,347 | B2 | 2/2011 | Gill et al. | |
| 8,099,316 | B2 * | 1/2012 | Moukas et al. | 705/7.29 |
| 8,165,916 | B2 | 4/2012 | Hoffberg et al. | |
| 2003/0070167 | A1 * | 4/2003 | Holtz et al. | 725/32 |
| 2004/0205135 | A1 | 10/2004 | Hallam-Baker | |
| 2006/0206355 | A1 | 9/2006 | Cheung et al. | |
| 2007/0088605 | A1 * | 4/2007 | Ghate et al. | 705/14 |
| 2007/0191040 | A1 | 8/2007 | Kadar et al. | |
| 2007/0242700 | A1 * | 10/2007 | Moote et al. | 370/486 |
| 2007/0244760 | A1 * | 10/2007 | Bodnar et al. | 705/14 |
| 2008/0021778 | A1 * | 1/2008 | Perkowski et al. | 705/14 |
| 2008/0120129 | A1 * | 5/2008 | Seubert et al. | 705/1 |
| 2008/0167957 | A1 * | 7/2008 | Steelberg et al. | 705/14 |
| 2008/0235327 | A1 * | 9/2008 | Maes et al. | 709/203 |
| 2008/0255936 | A1 * | 10/2008 | Ghate | 705/14 |

(Continued)

OTHER PUBLICATIONS

Business_Process_Execution_Languag02nov2012; Wikipedia Nov. 2, 2012.*

(Continued)

*Primary Examiner* — John G Weiss
*Assistant Examiner* — Adam Chornesky
(74) *Attorney, Agent, or Firm* — Fliesler Meyer LLP

(57) ABSTRACT

A mobile communications marketing and advertising platform is described for delivering advertising content to subscribers of a telecommunications network over telecom-based channels, such as SMS, MMS and WAP Push. The platform is integrated with business tools, such as business process execution language (BPEL) based systems, business intelligence (BI) systems, Billing and Revenue Management (BRM) and business analytics monitoring (BAM) systems. By integrating these systems, the business tools can leverage the data generated by the mobile marketing and advertising platform in order to provide an improved view, analysis and understanding of the content delivery process. Similarly, the mobile marketing platform can utilize the functionality provided by the integrated business systems in order to more efficiently deliver the advertising content to subscribers.

16 Claims, 8 Drawing Sheets

(56) References Cited

U.S. PATENT DOCUMENTS

| | | |
|---|---|---|
| 2008/0255944 A1 | 10/2008 | Shah et al. |
| 2008/0275753 A1* | 11/2008 | Protheroe et al. ............ 705/8 |
| 2008/0275777 A1* | 11/2008 | Protheroe et al. ............ 705/14 |
| 2008/0307108 A1* | 12/2008 | Yan et al. ............ 709/231 |
| 2009/0012807 A1* | 1/2009 | Atherton et al. ............ 705/1 |
| 2009/0089131 A1* | 4/2009 | Moukas et al. ............ 705/8 |
| 2009/0094114 A1* | 4/2009 | Rice et al. ............ 705/14 |
| 2009/0171948 A1 | 7/2009 | Solomon et al. |
| 2009/0217316 A1 | 8/2009 | Gupta |
| 2009/0240586 A1* | 9/2009 | Ramer et al. ............ 705/14 |
| 2009/0271267 A1* | 10/2009 | Moukas et al. ............ 705/14.48 |
| 2009/0298480 A1 | 12/2009 | Khambete et al. |
| 2009/0306834 A1* | 12/2009 | Hjelm et al. ............ 701/1 |
| 2009/0307091 A1 | 12/2009 | Lilley |
| 2010/0058383 A1 | 3/2010 | Chang et al. |
| 2010/0063877 A1* | 3/2010 | Soroca et al. ............ 705/14.45 |
| 2010/0107191 A1 | 4/2010 | Feng et al. |
| 2010/0142421 A1* | 6/2010 | Schlicht et al. ............ 370/310 |
| 2010/0161638 A1 | 6/2010 | Macrae |
| 2010/0291924 A1 | 11/2010 | Antrim et al. |
| 2010/0312643 A1 | 12/2010 | Gil |
| 2011/0016479 A1* | 1/2011 | Tidwell et al. ............ 725/9 |
| 2011/0065421 A1* | 3/2011 | Gluck et al. ............ 455/414.1 |
| 2011/0112905 A1* | 5/2011 | Pulijala et al. ............ 705/14.64 |
| 2011/0112906 A1 | 5/2011 | Pulijala et al. |
| 2011/0191163 A1 | 8/2011 | Allaire et al. |
| 2011/0196742 A1* | 8/2011 | Holal et al. ............ 705/14.54 |
| 2012/0179534 A1* | 7/2012 | Moukas et al. ............ 705/14.41 |
| 2012/0208512 A1* | 8/2012 | Maharajh et al. ............ 455/414.1 |

OTHER PUBLICATIONS rfc3588_DiameterProtocolAAA—providing Authentication, Authorization and Accounting; Sun Microsystems, Cisco Systems; Sep. 2003.*

Diameter_(protocol); http://en.wikipedia.org/wiki/Diameter_(protocol); accessed by Examiner Nov. 6, 2012.*

Oracle; Oracle Communications Marketing and Advertising; System Owner User's Guide Release 5.0.0.0 E15497-01; Nov. 2009; 260798, Appendix to the Specification, Whole Document.*

International Preliminary Examination Report dated May 24, 2012 for Application No. PCT/US2010/056593, 6 pages.

* cited by examiner

MOBILE ADVERTISEMENT AND MARKETING INTEGRATION WITH BUSINESS PROCESS AND WORKFLOW SYSTEMS

CLAIM OF PRIORITY

The present application claims the benefit of U.S. Provisional Patent Application No. 61/260,798, entitled "COMMUNICATIONS MARKETING AND ADVERTISING SYSTEM AND METHOD", by Sharath Rajasekar et al., filed on Nov. 12, 2009, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to systems for delivering marketing and advertising over mobile communications, and in particular to integrating such marketing and advertising systems with business processes and business intelligence software.

BACKGROUND

Online integration with various communication devices is creating new realms for advertisers and other content providers. Marketing campaigns in the past have been mostly focused on television, radio, paper media and internet. Today's advertisers are seeking a more tailored and personalized approach. Rather than bombarding the masses with general interest ads, the advertisers are slowly becoming more focused on selected groups of people that have a common interest in a particular subject, product or service. This is proving to enable both higher returns on investment (ROI) on the part of the advertiser, as well as less annoyance and frustration on the part of the consumer.

In this context, some industry rivalries are beginning to emerge between network operators (e.g. T-Mobile, Verizon Wireless, AT&T, etc.) on the one hand and internet service providers (ISPs), online ad vendors and various other content providers on the other. While ad server vendors, such as Google, have shown a very successful business model in online advertising, network operators have played a much less significant part in targeting ads. Yet network operators are uniquely and favorably positioned in the marketplace for obtaining various information and managing diverse relationships between a multitude of players. In addition to having access to the user's preferences and data, the operator also controls many aspects of the communication transmission in the network. For example, the network operator owns the mobile cellular network and its hardware elements (SMS-C, MMS-C, etc) as well as the information regarding its subscribers. As new services and products emerge, it is desirable for network operators to manage and monetize their position in order to continue to be able to compete in the future.

One area of potential improvement in this environment arises from the need for the network operator to integrate any sort of mobile communications advertising system with existing business management systems typically used by large enterprises. For example, it is desirable that marketing and advertising seamlessly integrate with existing business tools such as business process execution language (BPEL) based systems, business intelligence (BI), Billing and Revenue Management (BRM) and business activity monitoring (BAM) systems.

DETAILED DESCRIPTION

Figure 1:
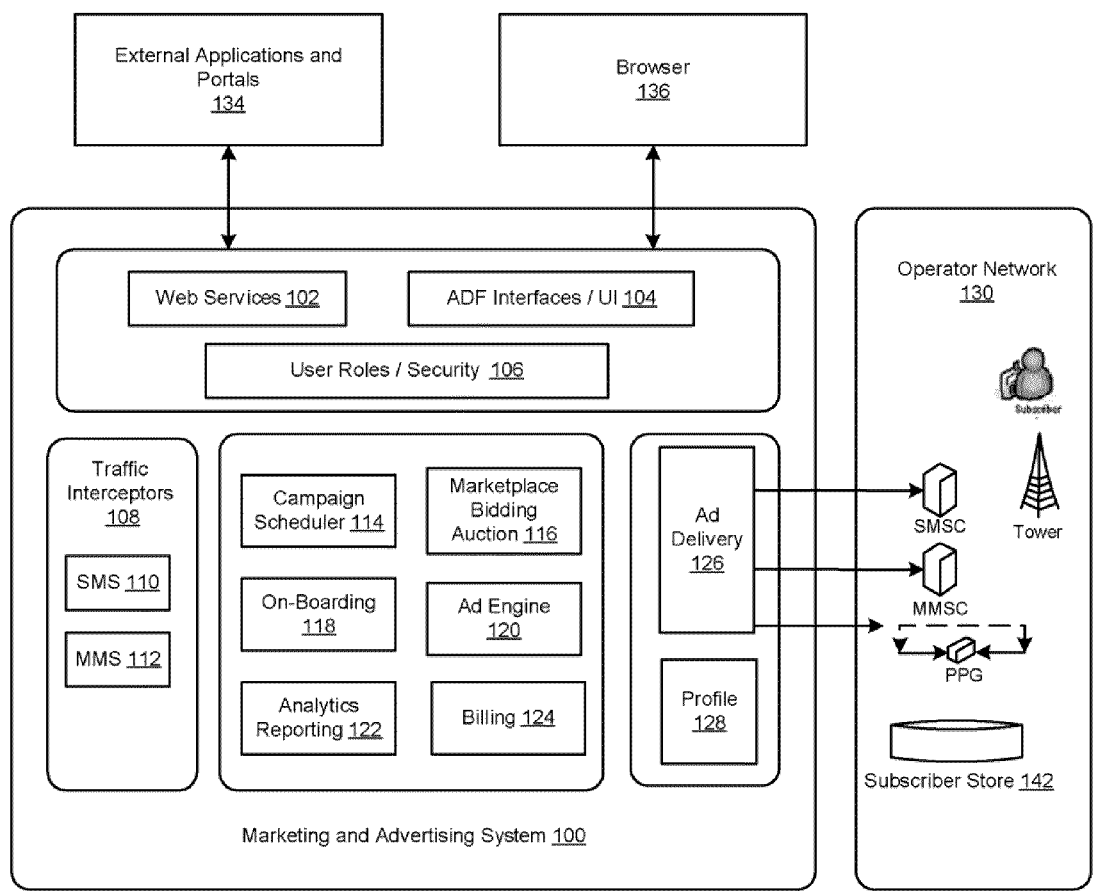
FIG. 1 is a high level illustration of the mobile marketing and advertisement content delivery platform, in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In this disclosure, a mobile communications marketing and advertisement platform is described for delivering ad content to subscribers of a mobile telecommunications network over telecom-based channels, such as Short Messaging Service (SMS), Multimedia Messaging Service (MMS) and Wireless Application Protocol (WAP) Push. In various embodiments, the marketing and advertising platform is integrated with existing business tools, such as business process execution language (BPEL) based systems, business intelligence (BI), Billing and Revenue Management (BRM) and business analytics monitoring (BAM) systems. By using such integration, these business tools can leverage the data generated by the marketing and advertising platform in order to gain a more efficient means for delivering the advertising content to the subscribers.

In one embodiment, the mobile marketing and advertising platform is deployed by a network operator (e.g. AT&T, Verizon Wireless, T-Mobile, etc.) at the gateway to its telecom network. The system provides a means for the operator to manage and monetize the relationships between advertisers, various web application owners, subscribers and other entities.

In various embodiments, the platform provides a marketplace component that allows ad space owners (e.g. owners of applications that send/receive SMS messages) to login and create ad spaces and put them up on auction. Various advertisers can then use the marketplace to bid on these ad spaces. Once the bids are submitted by the advertisers, they can remain pending until approved by the ad space owner. In this manner, the marketplace simplifies the pairing of advertisers with appropriate contexts for the promotional messages they wish to send. By using the marketplace, applications can offer ad spaces and advertisers can search for openings and bid on them. Based on network availability, operators can also offer customizable bulk messaging slots, purchased by advertisers on a fixed-price basis.

In one embodiment, once a bid has been approved by the ad space owner, it becomes a campaign that is scheduled and managed by a campaign manager of the platform. A campaign is a set of ads that will be sent to subscribers of the telecom network. In one embodiment, the campaign specifies a start time, an end time and a number of messages that will be sent. There can be two types of campaigns—marketing campaigns and advertising campaigns.

In an advertising campaign, applications offer space in the messages they send out to subscribers. Advertising campaigns utilize these ad spaces to deliver an advertiser's content to subscribers. The event that triggers the sending of the ad comes from outside of the platform. The cost associated with the advertising campaigns is arrived at through the auction process in the marketplace. One type of advertising campaigns is an application-to-person (A2P) campaign. In this campaign, messages originate with an application. The advertising platform intercepts the messages as they travel to the subscriber and injects an ad into the message. Another type of advertising campaign is person-to-application (P2A). In this type of campaign, a subscriber may send a message to an application, such as a reality television voting application. The subscriber's message is intercepted on the way to the application and a response message for the subscriber is sent, for example thanking them for voting. This response message contains the ad.

In a marketing type of campaign, the platform can actually act as a source of the messages sent to subscribers based on the configuration set by the advertisers. In one embodiment, a basic pattern is created, called a marketing space, which predefines basic characteristics of the possible ads (e.g. the available start and end times, the channel and the connection configuration to be used. The per unit cost can be fixed by the pattern. Advertisers select the space they wish to use and add their content. The platform then creates the ads in bulks and sends them to subscribers either based on subscriber lists uploaded by the advertisers themselves, or according to various criteria. For example, some advertisers may already have their own lists of subscribers who wish to receive information from them. In this type of marketing campaign, the advertiser can simply upload its list to the system along with the ad content. The marketing platform then creates the messages and sends them to the addresses on the list. In criteria-based marketing campaigns, the system owner and the network provider make certain demographic categories available from the subscriber database by using the subscriber profile module of the system. The advertiser then chooses the demographic group(s) that it wishes to target. The list of addresses is generated by the system and the messages with the ad content are sent to those addresses. In one embodiment, the actual list of addresses is hidden from the advertiser and not released to them.

Once the campaign has been scheduled and activated, an ad delivery component of the marketing system can carry out the transmission of all messages containing ad content to the subscribers. For example, an ad engine is responsible for the mechanics of matching ad content with the appropriate messaging context, whether it be ad spaces in intercepted messages from an application or bulk messages generated with the system itself. In criteria based campaigns, the engine is also responsible for ensuring that the subscribers who are targeted fit the correct demographic profile.

In various embodiments, the mobile marketing and advertising platform described above can be integrated with a set of business tools used by organizations in order to better manage the data generated as a result of providing the mobile content. In one embodiment, the platform is integrated with a workflow system, such as a BPEL-based system, business process management (BPM) system or some other workflow based system for managing the business processes of an organization. The workflow process system is used to access the mobile advertising content delivery platform over a set of web services that are exposed by the platform. In one embodiment, the workflow system can then be used to create process instances that automate campaign approval process or perform some other automation of the graphical user interface (GUI) based functions.

In various embodiments, the mobile marketing and advertising platform can also be integrated with business intelligence (BI) based systems. BI systems are typically used to analyze a set of business data by storing the data into a warehouse and running various queries on the data. In the context of the present disclosure, the data generated by the mobile advertising content delivery platform can be retrieved by the business intelligence application from the mobile advertising content delivery platform over Java Database Connectivity (JDBC) and stored a data warehouse. The business intelligence application then performs a set of queries and data analytics functions on the data stored in the warehouse.

In various embodiments, the mobile marketing and advertising platform can also be integrated with business activity monitoring (BAM) type systems. BAM systems typically enable building interactive, real-time dashboards and proactive alerts for monitoring business processes and services. BAM can give users the information they need to make decisions that involve real time changing data and take corrective action if the business environment changes. In one embodiment, the mobile marketing platform generates event data records (EDRs) upon sending each message containing the advertising content to the recipient devices of the telecom network. An EDR listener can be registered in the platform to listen for the EDR and transmit a Java Messaging Service (JMS) message to the business activity monitor, wherein the data in the JMS message is then used to generate the real time graphs by the business activity monitor. In various embodiments, the JMS message payload can include information about the campaign, the message that was sent and delivered, revenue information and the like.

In various embodiments, the mobile marketing and advertising platform can also be integrated with billing and revenue management (BRM) systems. BRM systems typically provide online and/or offline charging for various mobile communications. In one embodiment, the mobile advertising content delivery platform generates a charging data record (CDR) upon sending messages of the campaign. In addition, the platform can use a CDR listener that detects the generated CDR and invokes a Diameter protocol function to access the BRM system. In this manner, the platform can be set up to deliver charging data to any billing system that can support Diameter protocol.

FIG. 1 is a high level illustration of the mobile marketing and advertisement content delivery platform, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communications marketing system 100 can be deployed by a network operator and can be exposed to external applications and portals 134 over Web Services 102. It can also be made accessible by way of browser 136 enabled devices over ADF interfaces, UIs and the like 104. Access to the marketing system can be controlled based on assigned user roles and other security measures 106. In one embodiment, the marketing system resides at the gateway to the operator's network.

The mobile marketing and advertising platform 100 includes a set of traffic interceptors 108 that can intercept message traffic between subscribers of the operator's network 130 and inject various advertisements therein, as well as perform a variety of other functions. For example, an SMS interceptor 110 may intercept an SMS message and transmit a response SMS with an advertisement embedded in the response. Similarly, an MMS interceptor 112 may intercept an MMS message and embed some content customized for the receiving subscriber according to their profile. The traffic interceptors can be applied as a chain in a particular sequence to the messages flowing through the network. Each interceptor may contain a set of filters to discern which messages it should be applied to, such that the interceptor is only executed for the messages containing a certain criteria.

The core of the marketing platform can comprise a campaign manager or scheduler 114, a marketplace component 116, an on-boarding component 118, an ad engine 120, analytics and reporting 122 and a billing component 124. All of these components can enable the operator to allow advertisers to create marketing campaigns which will be carried out using the marketing system. These campaigns can be marketing campaigns based on bulk messages to lists of subscribers, or can be advertisement campaigns that embed ad content into messages or generate reply messages as responses to selected message traffic. In one embodiment, the advertiser creates a campaign based on available campaign spaces. It provides the ad content and, if desired, provides the subscriber lists for the marketing campaigns. The campaign is then carried out by transmitting the appropriate ads in accordance with various traffic handling techniques. In addition, the advertiser can monitor its campaigns and obtain access to the statistics for them.

The campaign scheduler 114 is responsible for scheduling the campaigns and managing their lifecycles, as will be described in further detail below with reference to FIG. 5. For example, when a bid is approved by an ad space owner, the ad space becomes an active campaign that is scheduled to run by the campaign scheduler 114.

The marketplace component 116 allows the operator to pair advertisers with various applications that may be sending or receiving SMS/MMS messages. Using the marketplace of the marketing and advertising system, applications can offer ad spaces and advertisers can search for openings and bid on them. As an illustration, if a text-to-vote television show were aired that was expected to receive a particular number of SMS votes, a corresponding ad campaign could be created. The various advertisers can then submit bids for an advertising spot in the exchange of SMS messages that would be transmitted over the network. For example, an organization can submit an electronic bid offering a particular amount for each SMS message. The network operator can then award the campaign to the winning bid. In this manner, the electronic marketplace provides the network operator with means for creating and monetizing relationships between advertisers, service providers (e.g. text-to-vote application) and mobile subscribers. Based on network availability, operators can also offer customizable bulk messaging slots, purchased by advertisers on a fixed-price basis, with the entire transaction enabled through the browser-based interface 136.

The ad engine 120 can be responsible for the mechanics of matching ad content with the appropriate messaging context, whether it be ad spaces in intercepted messages from an application or bulk messages generated by the system itself. The ad engine performs its functions once the campaign has been initiated through the graphical user interface (GUI). In criteria-based campaigns, the ad engine is also responsible for ensuring that the subscribers who are targeted fit the correct demographic profile as derived from the information obtained in the subscriber profile data store 142.

The analytics, reporting and statistics engine 122 can enable monitoring the progress of a campaign, such as the number of ads served, the ongoing cost/revenue and the like both as it happens in real time and collectively over longer periods of time. This monitoring can be used by the advertisers, applications and operators in various ways. The system can display data pertinent to each user type in both detailed tables and dashboard-like charts and graphs.

The on-boarding component 118 can allow the operator to integrate various external partners, customers, advertisers and other entities with the communications marketing system 100. The on-boarding module can take care of registering the new entity so that appropriate access can be provided to the system from its perspective. In one embodiment, the registration on-boarding component 118 can assign users into various roles, such as system owner, network provider, ad space owner, advertiser and others.

The billing integration module 124 can produce detailed charging data records (CDRs) for each ad served through the system. The CDRs can be converted into Diameter Rf offline charging within the system and then passed onto billing systems such as billing and revenue management (BRM) systems for rating and billing. The billing integration module will be described in further with reference to FIG. 3C.

Ad delivery 126 can be performed by employing the short messaging service center (SMS-C), multimedia messaging service centers (MMS-C), Push Proxy Gateway (PPG) and other internal network components of the operator. In addition, the subscriber profile module 128 can be used to retrieve subscriber information and obtain a list of people to be targeted with ads based on demographic information or specific attributes about a specific person being looked up based on their phone number. All of this targeting of advertisements can be based on the data that the network operator has in the subscriber store 142 about each of its subscribers.

Figure 2:
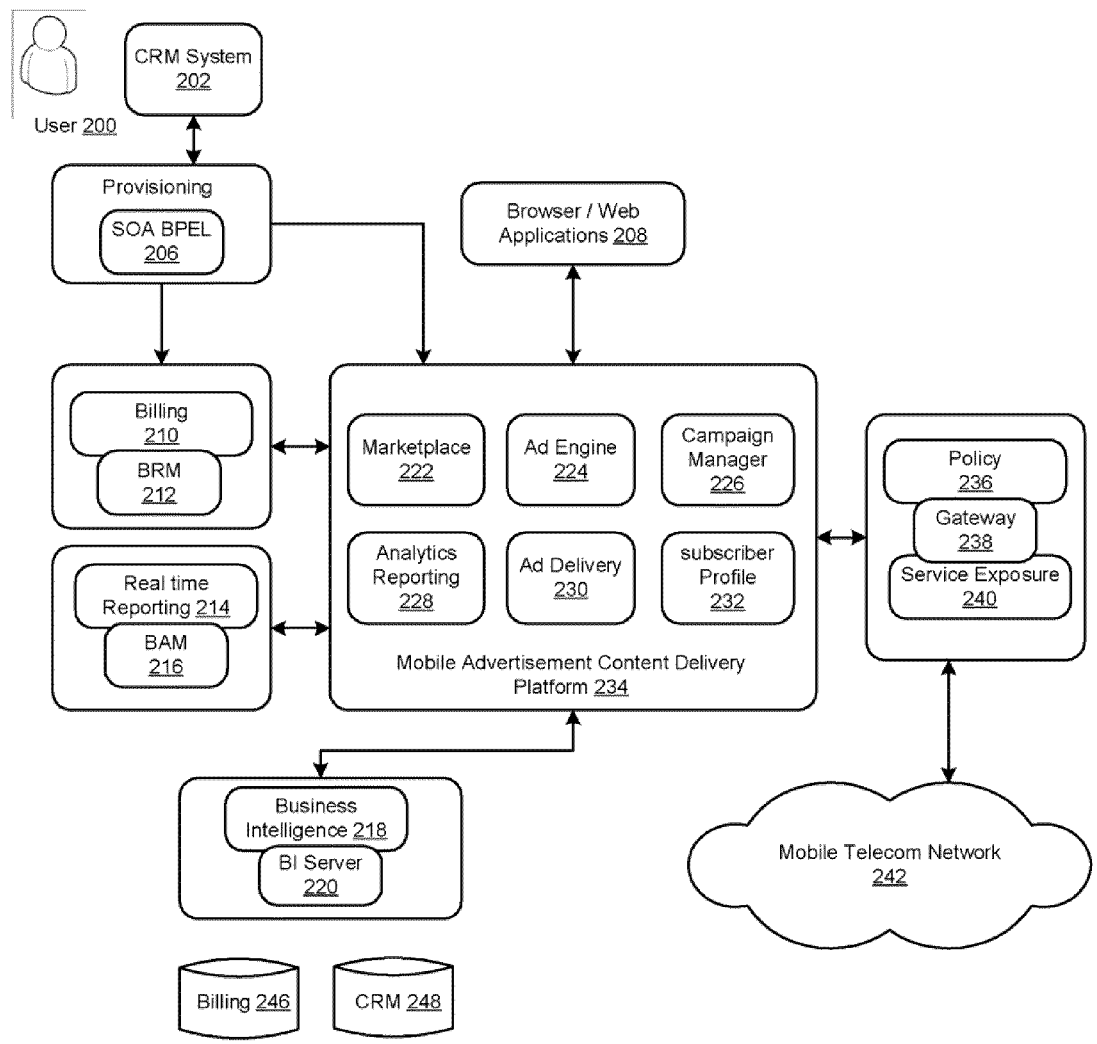
FIG. 2 is an illustration of the mobile marketing platform being integrated with a set of business tools, in accordance with various embodiments of the invention.

FIG. 2 is an illustration of the mobile marketing platform being integrated with a set of business tools, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As previously described, the mobile marketing and advertising platform 234 can be comprised of a marketplace component 222, an ad engine 224, a campaign manager 226, internal analytics and reporting modules 228, ad delivery components 230 and a subscriber profile module 232. In addition, however, the mobile marketing platform 234 can be deployed in an enterprise environment, where users 200 have access a wide variety of business tools, such as customer relations management (CRM) applications 202, service oriented architecture (SOA) and BPEL based systems 206, billing 210 and BRM based systems 212, real-time reporting tools 214 such as business activity monitors (BAM) 216, business intelligence (BI) tools 218, such as a BI server 220 and warehouse having access to the billing data 246 and CRM data 248. Each of these business tools can be integrated with the mobile marketing and advertising platform, as will be described in the following figures and their associated text.

In addition, the mobile marketing and advertising platform can integrate with a service access gateway 238 deployed as a gatekeeper to the telecom network 242. Service access gateway can provide the policy enforcement 236, as well as service exposure functions 240 in order to allow various online and browser based applications 208 to provide services to the subscriber devices of the mobile network 242.

Figure 3A:
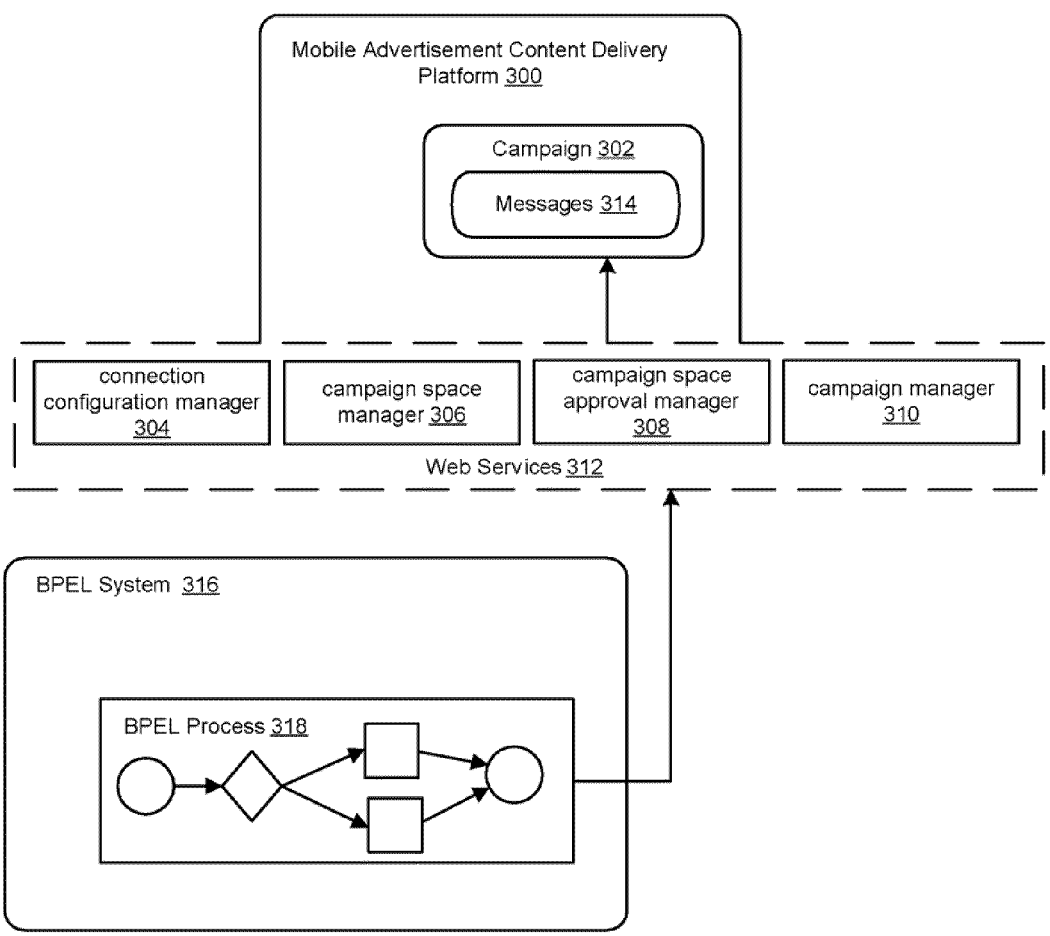
FIG. 3A is an illustration of the mobile marketing platform being integrated with a workflow based system, in accordance with various embodiments of the invention.

FIG. 3A is an illustration of the mobile marketing platform being integrated with a workflow based system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the mobile advertising content delivery platform 300 can expose a set of web services 312 that can be accessed by the BPEL based system 316 or another workflow system. The BPEL system and its various processes 318 can then use these web services to construct campaigns 302 that will deliver the SMS/MMS messages 314 containing the ad content. The platform can also provide a web services description language (WSDL) document for describing how to access the web services.

In one embodiment, the mobile advertising platform exposes four basic web services. The connection configuration manager 304 web service can support operations to create bulk messaging connection configurations for marketing campaigns, as well as create the connection configuration for advertising campaigns. It can also include functions to delete the connection configuration, or list information regarding the configuration.

In one embodiment, the campaign space manager web service 306 includes a set of functions for managing campaign spaces, such as createBulkMsgMarketingSpace, createMsgServiceAdSpace, deleteCampaignSpace, listBulkMsgMarketingSpaceBySpaceOwner, listMsgServiceAdSpaceByAdSpaceOwner. Additionally, this web service can include a set of functions for searching for connection configurations, such as listBulkMsgCcByAdSpaceOwner, listMsgServiceCcByAdSpaceOwner. For campaign evaluation, the campaign space manager 306 can also include functions such as approveCampaign, rejectCampaign, listBulkMsg-MarketingCampaigns, listMsgServiceAdCampaigns, and the like.

In one embodiment, the campaign space approval manager web service 308 can include operations such as approveCampaignSpace or rejectCampaign.

In one embodiment, the campaign manager web service 310 can include functions for managing ad content, including createSmsAdContent, createMmsAdContent, createWapPushAdContent, deleteAdContent, listSmsAdContents, listMmsAdContents, listWapPushAdContents. In addition, the campaign manager can provide functions for managing subscriber lists and categories, such as createSubscriberAddressList, listSubscriberAddressList, deleteSubscriberAddressList, and listCategories. Additionally, this web service 310 can include functions for campaign management, such as createMsgServiceAdCampaign, createBulkMsgMarketingCampaignWithAddressList, createBulkMsgMarketingCampaignWith-SelectionCriteria, stopCampaign, deleteCampaign, listBulkMsgMarketingCampaignsByAdv, listMsgServiceAdCampaignsByAdv, getBulkMsgMarketingCampaign, and the like. The term "Adv" in these functions represents the advertiser role assigned to a particular user. Finally, for searching for campaign spaces, the web service 310 can include functions such as listBulkMsgMarketingSpacesByAdv and listMsgServiceAdSpaceByAdv.

By employing all of these web services exposed by the platform, the BPEL system can use various workflow processes to automate any portion or all of the campaign management, approval or other functions that can otherwise be performed by a user using a GUI. For example, an organization may already have its own internal business processes defined for approving a campaign and the integration with BPEL systems allows these organizations to easily use those business processes with the mobile advertising platform 300.

Figure 3B:
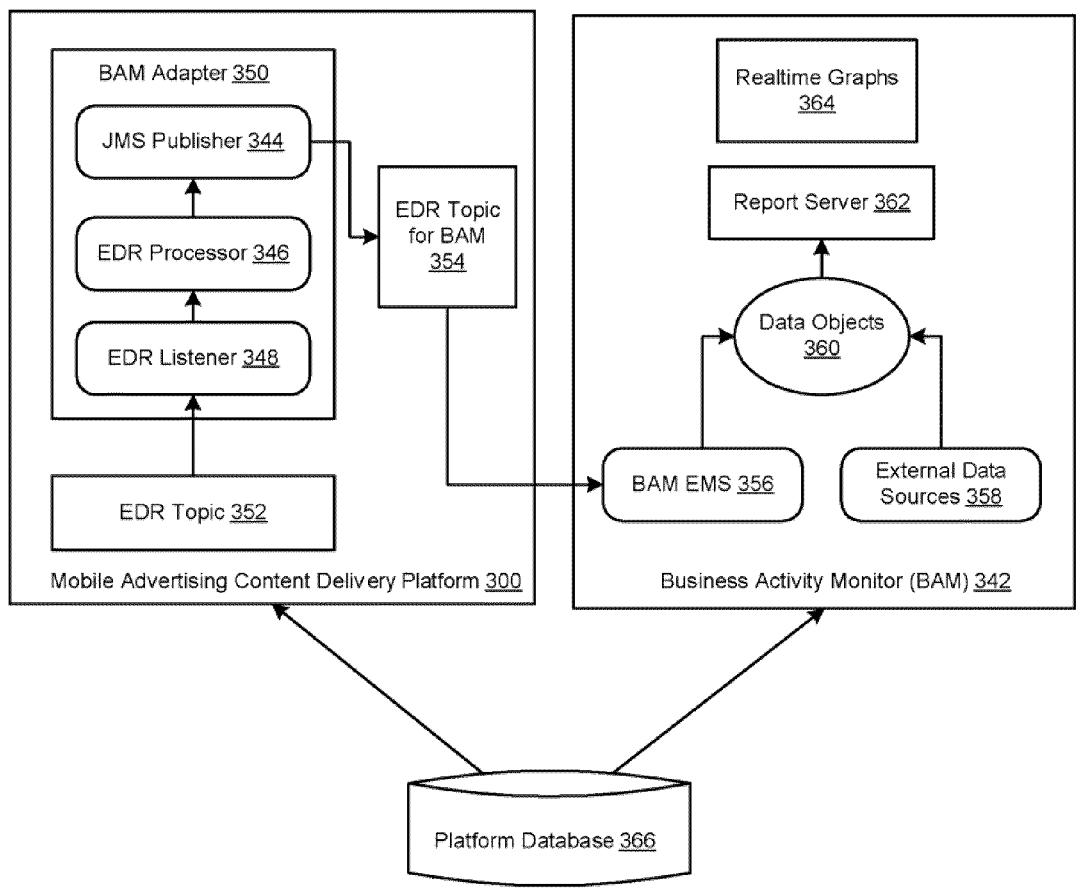
FIG. 3B is an illustration of the mobile marketing platform being integrated with business activity monitoring system, in accordance with various embodiments of the invention.

FIG. 3B is an illustration of the mobile marketing platform being integrated with business activity monitoring system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the mobile marketing and advertising platform 300 servers continuously record basic information about their status through an internal event mechanism. An event is fired at designated times as the server functions, for example, whenever a request crosses module boundaries, specific methods are called, or exceptions are thrown. This event information is sent to the EDR service, where an extensible markup language (XML) based filter processes the events and separates them into types. The filters can also be used to transform the data in the original event, including adding other useful information.

In one embodiment, there are three filters that produce three distinct types of data: event data records, charging data records, and alarms. When the information has been processed by the filters, it is delivered to type-specific listeners. To communicate with the business activity monitor (BAM) 342, the mobile marketing platform 300 uses this mechanism to publish event data records (EDRs) to an EDR topic 352 every time an event occurs within the system. For example, each time that a message containing ad content is delivered to a mobile device, the system 300 can publish an EDR to the topic 352.

The business activity monitor (BAM) adapter can be provided on the platform to enable it to integrate with BAM 342. This adapter can include an EDR listener 348 that listens for the various EDRs on the EDR topic 352. The BAM adapter can also include an EDR processor 346 to process the EDRs, as well as a JMS Publisher 344 that will send a JMS message to the registered BAM enterprise messaging source (EMS) 356 of the business activity monitor 342. In one embodiment, the JMS message contents include any or all of the following information:

1. Timestamp—time of the event, as recorded in the mobile advertising platform;
2. Campaign ID—the internal identifier for the campaign within the system;
3. Campaign Name—name given to the campaign when it was initiated;
4. Advertiser ID—the internal identifier for the advertiser organization that initiated the campaign;
5. Service Provider ID—the internal ID for the Ad Service Provider organization that initiated the campaign;
6. Network Provider ID—the internal ID for the Network Provider organization that is responsible for the connection configuration used by the campaign;
7. Price—the price paid for the message in appropriate currency;
8. Event type—an enumeration, such as "Ad Served" or "Ad Impression". An "ad served" indicates that the message has been successfully delivered to the underlying network. An "Ad Impression" indicates that a delivery notification concerning the message has been received from the underlying network;
9. Category List—the types used to define demographic categories used to send bulk messages. The types depend on configuration, but can include such things as age, gender and the like;
10. Subscriber List—the address of the subscriber who received the message;
11. Delivery Notification Enabled—a Boolean value that indicates if delivery notification is enabled for the campaign.

The business activity monitor 342 can then use the information in the JMS message to create the appropriate data objects 360 and provide the data to the report server 362 in order to generate the real time graphs 364 and charts for the user. In various embodiments, BAM 342 can have access to the database of the mobile marketing and advertising platform, as well as be connected to other external data sources 358.

Figure 3C:
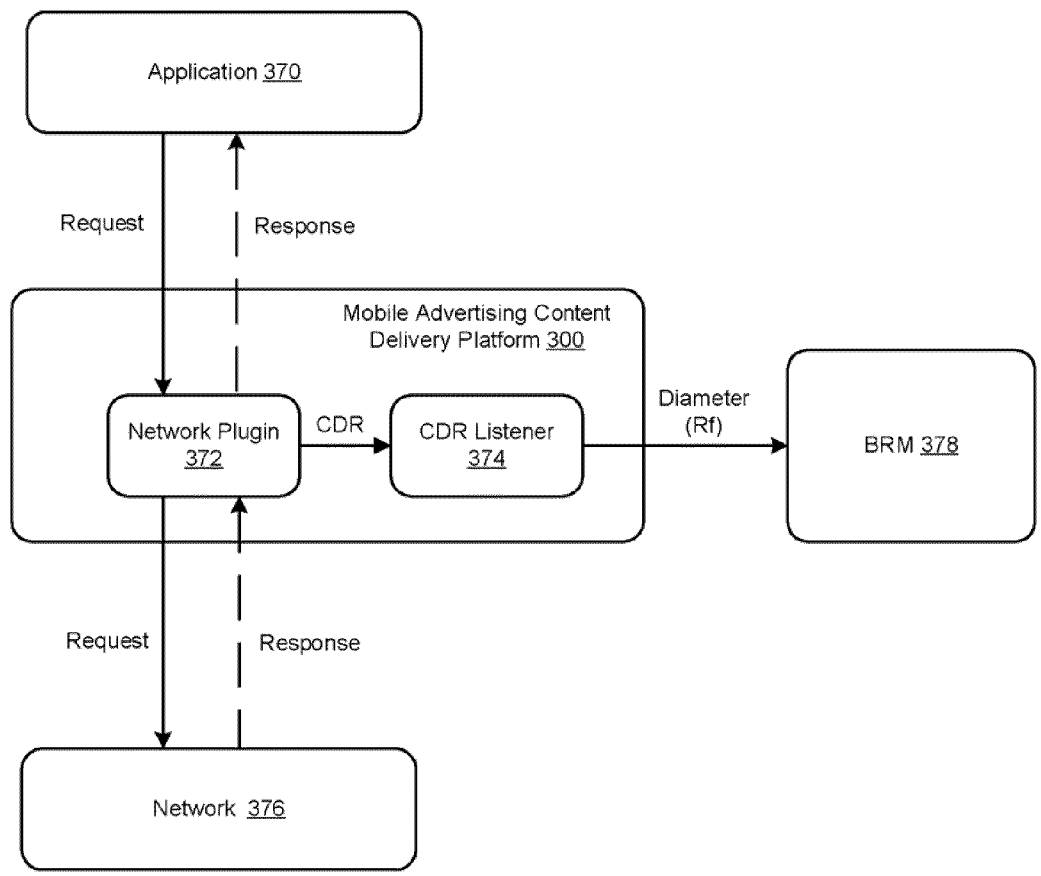
FIG. 3C is an illustration of the mobile marketing platform being integrated with a billing and revenue management (BRM) system, in accordance with various embodiments of the invention.

FIG. 3C is an illustration of the mobile marketing platform being integrated with a billing and revenue management (BRM) system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, mobile marketing platform 300 can be positioned between the telecom network 376 and the various applications 370 that wish to access the network or provide some service thereon. The platform can utilize network plugins 372 to allow the application to access the resources of the network, such as the SMS-C and MMS-C.

In one embodiment, the mobile marketing platform can be set up to deliver charging data to a billing and revenue management (BRM) system 378 over the Diameter (Rf) protocol. A charging data record (CDR) listener 374 can be deployed to listen to CDRs generated by the network plugin and to generate appropriate Diameter (Rf) messages to the BRM system. In one embodiment, the CDR listener is a cluster singleton service, so it executes only on one server at any given time and is transferred to another server in case of server failure. The management part can be distributed to all servers in the cluster and thus can be managed from any server in the cluster. In alternative embodiments, the CDR listener need not be a singleton service and other implementations are possible.

Each Diameter (Rf) message generated by the platform can contain a set of attribute value pairs (AVPs) to specify charging information to the BRM system. The table below specifies one possible set of AVPs that can be utilized by the CDR listener.

| AVP | AVP Code | Type | Specification | Description |
| --- | --- | --- | --- | --- |
| Session_ID | 263 | UTF8String | RFC 3588 | Used to identify a specific session |
| Origin-Host | 264 | DiameterIdentity | RFC 3588 | Identifies the endpoint that originated this message. I equal to the delivery-mechanism host. |
| Origin_Realm | 296 | DiameterIdentity | RFC 3588 | Identifies the Realm of the originator of the delivery-mechanism |

-continued

| AVP | AVP Code | Type | Specification | Description |
| --- | --- | --- | --- | --- |
| Destination-Host | 293 | DiameterIdentity | RFC 3588 | Identifies the destination host |
| Destination-Realm | 283 | DiameterIdentity | RFC 3588 | Identifies the Realm of the destination host |
| Accounting-Record-Type | 480 | Enumerated | RFC 3588 | The type of accounting record being sent |
| Accounting-Record-Number | 485 | Unsigned2 | RFC 3588 | Identifies this record within this session. |
| Acct-Application-ID | 259 | Unsigned2 | RFC 3588 | Advertises support of the Accounting portion of an application. The field corresponds to the application ID of the Diameter Accounting Application and is defined with the value 3. |
| User-Name | 1 | UTF8String | RFC 3588 | The Advertiser External ID, assigned when the organization was created |
| Event-Timestamp | 55 | Time | RFC 3588 | Time the event happened, in seconds since Jan. 1, 1900 00:00 UTC |
| Service-Indication | 704 | OctetString | 3GPP 29.329 | A value to indicate the service, such as "ADVERT_SERVICE" |
| Event-Type | 823 | Grouped | 3GPP 29.299 | Contains information about the type of event for which the accounting request is generated |
| Event-Type-Event | 825 | UTF8String | 3GPP 29.299 | Specifies the Ad-event type. For example, AD_SERVED |
| Participants-Involved | 887 | UTF8Strng | 3GPP 29.299 | Lists the external ID of the related Ad Space Owner, Ad Service Provider and Network Provider. |
| CC-Money | 413 | Grouped | RFC 4006 | Specifies the monetary amount in the given currency, used for storing the price of the ad message. |
| CC-Money-Unit-Value | 445 | Grouped | RFC 4006 | Specifies the units as decimal value |
| Unit-Value.Value-Digits | 447 | Integer64 | RFC 4006 | Contains the significant digits of the number |
| Unit-Value.Exponent | 429 | Integer32 | RFC 4006 | Contains the exponent value to be applied for the Value-Digit AVP within the Unit-Value AVP |
| CC-Money.Currency-Cod | 425 | Unsigned32 | RFC 4006 | Specifies the currency, given as the numeric values defined in the ISO 4217 standard |

Figure 4A:
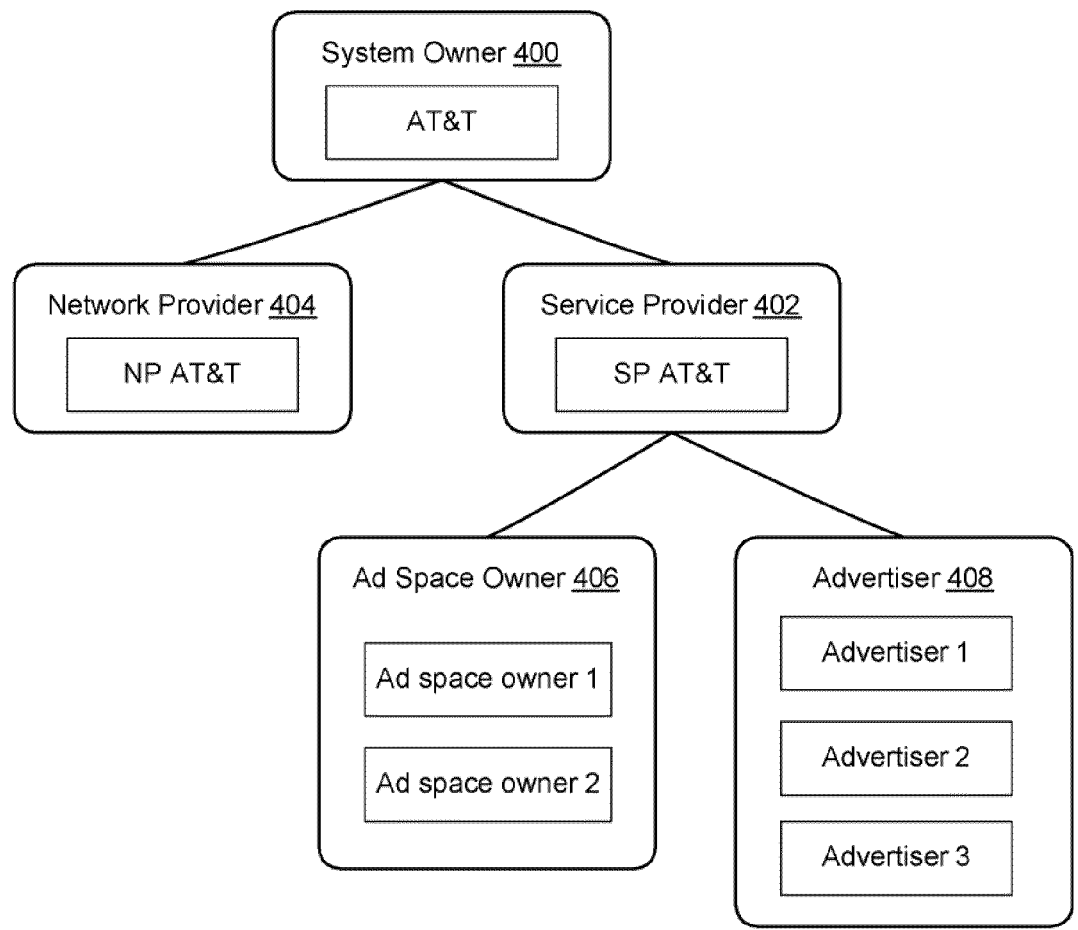
FIG. 4A is an illustration of the roles assigned to various organizations in the mobile marketing platform, in accordance with various embodiments of the invention.

FIG. 4A is an illustration of the roles assigned to various organizations in the mobile marketing platform, in accordance with various embodiments of the invention. As illustrated, each organization or user of the system can be assigned a role. The roles are shown in a particular hierarchy, however, it is not necessary for all embodiments of the invention that this particular hierarchy or these particular roles be used. Other variations are possible and within the scope of the present disclosure.

The system owner 400 represents the communications marketing and advertising platform itself. In one embodiment, the system owner is responsible for creating the network provider organization and users and is also responsible for the ad service provider organization and users. The system owner can act as a user in any organization in the system and perform those tasks.

The network provider 404 represents the network over which the message traffic flows. In one embodiment, the network provider makes decisions on baseline usage patterns, including capacity and messaging type. These decisions are arranged into sets known as connection configurations which are assigned to ad space owners.

The ad service provider 402, represents the point of contact between the marketing platform and its external users, i.e. the ad space owners and the advertisers. In one embodiment, the ad service provider creates advertisers and ad space owner organizations and users and manages the relationship. The ad service provider can own the marketplace and can act as a user in any of its advertiser or ad space owner organizations and perform those tasks. It can also create special advertising and marketing campaigns acting as a proxy for an advertiser. The ad service provider creates marketing spaces as a special ad space owner and can also monitor advertising and marketing campaigns.

The ad space owner 406 represents the applications that are offering space in their messages (e.g. SMS or MMS messages). In one embodiment, the ad space owner creates ad spaces in which advertisers can place their ads. The ad space owner can then approve or reject potential advertisers for campaigns using its ad spaces. It can also be provided with the ability to monitor the usage of its spaces.

The advertiser 408 represents the company or agency that wishes to promote its product or services. In one embodiment, the advertiser creates campaigns based on available campaign spaces. It provides ad content and if desired, provides subscriber lists for marketing campaigns. The advertiser can also monitor its campaigns.

Figure 4B:
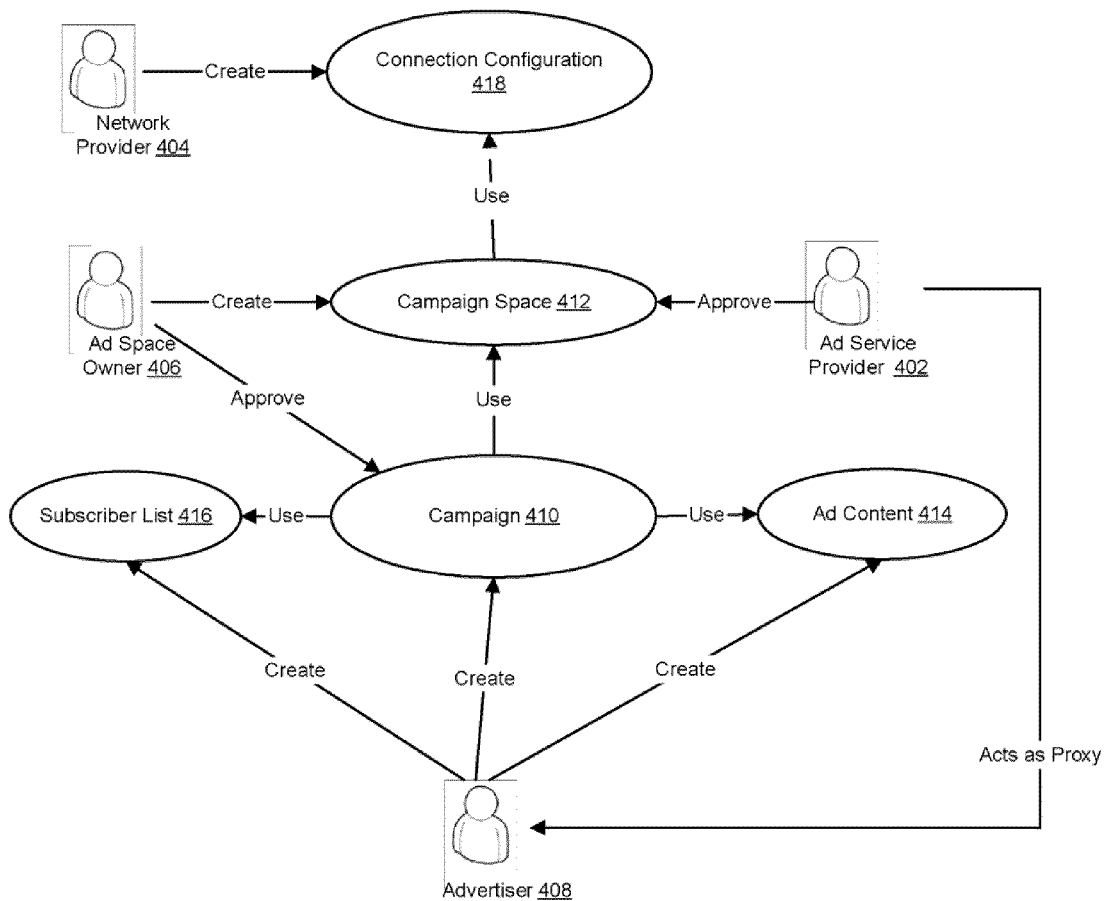
FIG. 4B is an illustration of the relationships between the various organizational roles of the communications marketing system, in accordance with various embodiments of the invention.

FIG. 4B is an illustration of the relationships between the various organizational roles of the communications marketing system, in accordance with various embodiments of the invention.

As illustrated, the network provider 404 can create and provide the connection configuration 418 used by the mobile marketing platform. The ad space owner 406 can create the campaign space 412 and can also approve the campaigns 410 that use that space. The ad service provider 402 can also approve the campaign space 412 and can also act as a proxy for the advertiser 408. The advertiser 408 can create the campaign 410 and ad content 414 to be inserted into the messages of that campaign 410. The advertiser can also create or upload its own subscriber lists 416 that will receive the ad content of the campaign.

Figure 5:
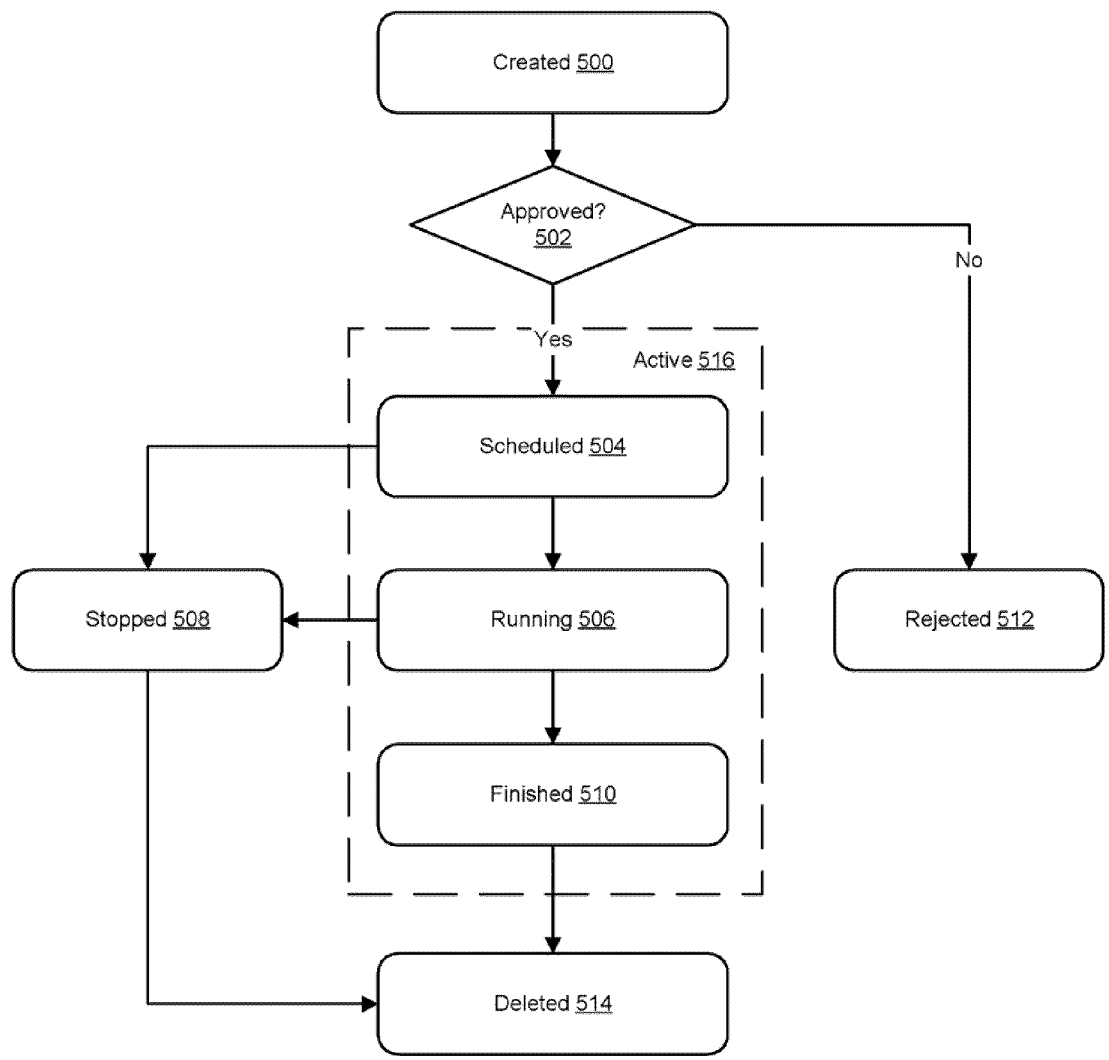
FIG. 5 is a flow chart diagram of a campaign lifecycle, in accordance with various embodiments of the invention.

FIG. 5 is a flow chart diagram of a campaign lifecycle, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, a campaign can be created by specifying the ad content, number of messages, start time and other information. Once created, the campaign waits until it is approved (step 502) either by the ad space owner or by the ad service provider, depending on the type of campaign. If the campaign is rejected 512, the lifecycle ends and the campaign never enters an active state 516. If the campaign is approved, it is scheduled (step 504) by the campaign scheduler and is running 506. Any time after scheduling the campaign, the campaign can be stopped (508) and deleted (514) if desired. Once the campaign is finished (510) it is complete and the data can be deleted.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for integrating mobile communications advertising with business processes, said system comprising:
  a mobile advertising content delivery platform, deployed in a gateway to a telecommunications network, including
    a marketplace component for creating an ad space for delivering advertising content to subscribers of the telecommunications network, wherein the marketplace allows an advertiser to submit a bid on the ad space,
    a campaign manager that creates at least one campaign including a set of messages for containing advertising content to be transmitted to subscribers of the telecommunications network,
    an on-boarding component that
      exposes, via a set of web services, a set of functions of the mobile advertising content delivery platform,
      registers an accessing application with the mobile advertising content delivery platform, and
      assigns the accessing application a role which defines access to the mobile advertising content delivery platform;
  a workflow process system that accesses and incorporates the set of functions into an existing business process by creating a process instance that automates at the exposed functions.

2. The system of claim 1, further comprising:
  a business activity monitor used to generate at least one real time graph, wherein the mobile advertising content delivery platform generates an event upon delivering each of the messages in the campaign, wherein upon generating the event, the mobile advertising content delivery platform transmits a Java Messaging Service (JMS) message to the business activity monitor, wherein the JMS message is used to generate the real time graph by the business activity monitor.

3. The system of claim 1, further comprising:
  a business intelligence application used to analyze a data generated by the mobile advertising content delivery platform, wherein the business intelligence application retrieves the data from the mobile advertising content delivery platform over Java Database Connectivity (JDBC) and stores the data in a data warehouse, and wherein the business intelligence application performs a set of queries and data analytics functions on the data stored in the warehouse.

4. The system of claim 1, further comprising:
a billing and revenue management (BRM) system that provides online and/or offline charging for mobile communications, wherein the mobile advertising content delivery platform generates a charging data record (CDR) upon sending at least one of said messages of the campaign, and wherein the mobile advertising content delivery platform further includes a CDR listener that detects the generated CDR and invokes a Diameter protocol function to access the BRM system.

5. The system of claim 1, wherein the mobile advertising content delivery platform further includes:
a subscriber profile module that obtains profile data associated with at least one of the subscribers of the telecommunications network from at least one subscriber data source and customizes the content of the messages of the campaign according to the profile data.

6. The system of claim 1, wherein the workflow process system is a business process execution language (BPEL) system that creates the campaign by employing one or more of the following web services:
a connection configuration manager web service, a campaign space manager web service, a campaign space approval manager web service, and a campaign manager web service.

7. The system of claim 1, wherein the mobile advertising content delivery platform is positioned to intercept a set of short messaging service (SMS) and multimedia messaging service (MMS) messages and to embed a set of advertising content into said messages.

8. A method for integrating mobile communications advertising with business processes, the method comprising:
creating a campaign using a mobile advertising content delivery platform, the platform including a marketplace component used to create the campaign including a set of messages for containing advertising content to be transmitted to subscribers of a telecommunications network the mobile advertising content delivery platform further including an ad engine that transmits the messages of the campaign, wherein the mobile advertising content delivery platform also manages, monitors, and evaluates the campaign;
exposing the functions of creating, approving, managing, monitoring and evaluating via a set of web services;
registering a workflow process system with the mobile advertising content delivery platform;
assigning a role to the workflow process system, the role defining access to the mobile advertising content delivery platform;
accessing, via the workflow process system, the exposed functions;
incorporating the exposed functions into an existing business process of the workflow process system by creating an process instance that automates the exposed functions.

9. The method of claim 8, further comprising:
generating at least one real time graph for the campaign by a business activity monitor, wherein the mobile advertising content delivery platform generates an event upon delivering each of the messages in the campaign, wherein upon generating the event, the mobile advertising content delivery platform transmits a Java Messaging Service (JMS) message to the business activity monitor, wherein the JMS message is used to generate the real time graph by the business activity monitor.

10. The method of claim 8, further comprising:
analyzing a data generated by the mobile advertising content delivery platform by a business intelligence application, wherein the business intelligence application retrieves the data from the mobile advertising content delivery platform over Java Database Connectivity (JDBC) and stores the data in a data warehouse, and wherein the business intelligence application performs a set of queries and data analytics functions on the data stored in the warehouse.

11. The method of claim 8, further comprising:
generating a charging data record (CDR) in the mobile advertising content delivery platform upon sending at least one of said messages of the campaign, and wherein the mobile advertising content delivery platform further includes a CDR listener that detects the generated CDR and sends a charging message to a billing and revenue management (BRM) system that provides online and/or offline charging for mobile communications.

12. The method of claim 8, wherein the marketplace component is accessible by a plurality of users, wherein the marketplace component is used to create an ad space for delivering content to subscribers of a telecommunications network, wherein the marketplace allows the users to submit a bid on the ad space and to approve said bid.

13. The method of claim 8, wherein the mobile advertising content delivery platform further includes:
a subscriber profile module that obtains profile data associated with at least one of the subscribers of the telecommunications network from at least one subscriber data source and customizes the content of the messages of the campaign according to the profile data.

14. The method of claim 8, wherein the workflow process system is a business process execution language (BPEL) system that creates the campaign by employing one or more of the following web services:
a connection configuration manager web service, a campaign space manager web service, a campaign space approval manager web service, and a campaign manager web service.

15. The method of claim 8, wherein the delivery platform is positioned to intercept a set of short messaging service (SMS) and multimedia messaging service (MMS) messages and to embed a set of advertising content into said messages.

16. A non-transitory computer-readable storage medium storing a set of instructions for integrating mobile communications advertising with business processes, said instructions, when executed by one or more processors, causing the one or more processors to perform the steps comprising:
creating a campaign using a mobile advertising content delivery platform, the platform including a marketplace component used to create the campaign including a set of messages for containing advertising content to be transmitted to subscribers of a telecommunications network the mobile advertising content delivery platform further including an ad engine that transmits the messages of the campaign, wherein the mobile advertising content delivery platform also manages, monitors, and evaluates the campaign;
exposing the functions of creating, approving, managing, monitoring and evaluating via a set of web services;
registering a workflow process system with the mobile advertising content delivery platform;
assigning a role to the workflow process system, the role defining access to the mobile advertising content delivery platform;

accessing, via the workflow process system, the exposed functions;

incorporating the exposed functions into an existing business process of the workflow process system by creating an process instance that automats the exposed functions.

* * * * *

UNITED STATES PATENT AND TRADEMARK OFFICE
CERTIFICATE OF CORRECTION

| | | |
|---|---|---|
| PATENT NO. | : 8,554,626 B2 | Page 1 of 1 |
| APPLICATION NO. | : 12/945755 | |
| DATED | : October 8, 2013 | |
| INVENTOR(S) | : Pulijala et al. | |

It is certified that error appears in the above-identified patent and that said Letters Patent is hereby corrected as shown below:

Title Page, column 2, under Other Publications, line 1, delete "Languag02nov2012;" and insert -- Language02nov2012; --, therefor.

In the Specification

In column 1, line 62, delete "etc)" and insert -- etc.) --, therefor.

In the Claims

In column 14, line 46, in Claim 1, after "automates" delete "at".

In column 17, line 5, in Claim 16, delete "automats" and insert -- automates --, therefor.

Signed and Sealed this
Twenty-fifth Day of February, 2014

Michelle K. Lee
*Deputy Director of the United States Patent and Trademark Office*